United States Patent [19]

Magyari

[11] 4,092,192

[45] May 30, 1978

[54] HIGH TEMPERATURE CAULKING COMPOSITION AND METHOD

[76] Inventor: Douglas Magyari, 526 Charlotte, Royal Oak, Mich. 48073

[21] Appl. No.: 776,217

[22] Filed: Mar. 10, 1977

[51] Int. Cl.$^2$ ............................................. B32B 35/00
[52] U.S. Cl. ................................ 156/69; 106/287.16; 156/329; 156/94; 264/30
[58] Field of Search ......................... 106/287 SB, 296; 260/37 SB, 46.5 A; 264/30; 156/69, 329, 94

[56] References Cited

U.S. PATENT DOCUMENTS

| 2,833,664 | 5/1958 | Knapp | 106/287 SB |
|---|---|---|---|
| 3,885,984 | 5/1975 | Wright | 106/287 SB |

*Primary Examiner*—Edward G. Whitby

*Attorney, Agent, or Firm*—Cullen, Settle, Sloman & Cantor

[57] ABSTRACT

A caulking composition and method, particularly for hermetically sealing coke ovens and the like having high temperature requirements. The composition is adhesive to metal surfaces at elevated oven temperatures, elastic to accommodate expansion, warping, etc. and drys to a crushable powder by the conclusion of the oven cycle. The composition comprises, by weight, 19 to 23% of a high temperature silicone oil, preferably about 20% dimethyl polysiloxane 20 to 34% of a thermally conductive white metal oxide, preferably zinc oxide, 20 to 34% of an inert particulate filler material, such as whiting and 22 to 35% of a hydrated alkaline metal oxide, such as hydrated lime.

13 Claims, No Drawings

4,092,192

HIGH TEMPERATURE CAULKING COMPOSITION AND METHOD

FIELD OF THE INVENTION

The present invention relates to caulking compositions and methods for sealing high temperature ovens, particularly coke ovens, having doors, lids, caps and other closures which must be hermetically sealed after each charge. The coke oven doors must be sealed to prevent air from entering the oven chambers which would damage the quality of the coke produced in the oven. Further, gas seepage from the oven must be reduced to an absolute minimum to meet the Environmental Protection Agency's standard for air pollution. More specifically, the caulking composition and method of this invention is adapted to sealing the doors of by-product ovens of the type commonly used for commercial production of coke.

In a by-product coke oven, batteries of ovens are located in side by side relation. The coal is normally charged through an opening or openings in the roof and the coke is heated indirectly by means of heated refractory walls, which in turn are heated by the burning of fuel. The battery of ovens has two sides, commonly referred to as the pusher side and the coke side, and each oven therefore has two doors. As described, these doors must be hermetically sealed to prevent air from entering the oven chamber which would cause some of the coke or gases to burn, thereby diluting the coke oven gases with nitrogen and lowering the heating value. Further, by-product coke oven doors must be hermetically sealed to prevent gases from escaping around the doors, to prevent pollution of the atmosphere and prevent warping of the coke oven doors, jams and frames.

The temperature of the metal surfaces will reach 1100° to 1200° F and the doors will expand and warp because of the differentials in temperature and pressure. The prior art has described a number of methods of sealing coke oven doors. However, these methods have been unable to meet the Environmental Protection Agency standards in many instances.

The early prior art included various luting procedures which utilized a mud-like mixture made of clay, boiler ashes and water and which was trowelled into the space between the door and the mounting. The composition dried almost immediately upon contact with the hot metal surfaces and began to fall off. Further, the material failed to hermetically seal the doors as now required by the EPA standards. Mechanical sealing means have also been attempted, as disclosed in U.S. Pat. No. 2,662,053. More recently, a combination of mechanical and ceramic caulking compositions has been utilized as described in U.S. Pat. No. 3,875,018.

Although the more recent methods have been more successful in sealing coke oven doors, the ceramic seals have been unable to meet EPA standards in many applications and the method has other serious disadvantages. Most importantly, the ceramic seal sets into a hard glass-like material which must be chipped or chiseled out of the door jams, etc. prior to removal or replacement of the doors. As set forth above, the doors must be removed for each charge of coke. Further, the material does not adhere well to itself, creating a serious problem when leakage occurs during the charge cycle.

Therefore, the coke industry requires a new approach to the problem of sealing by-product ovens which eliminates the problems with the early luting methods, the mechanical seals and the ceramic-mechanical seals described above. The caulking composition and method of this invention substantially reduces leakage while eliminating the problems of the ceramic and mechanical seals suggested by the prior art.

SUMMARY OF THE INVENTION

The method of the present invention solves the problems of the prior art by utilizing a caulking composition which adheres to metal surfaces at elevated oven temperatures up to about 1200° F, which has sufficient body to seal the crevices and spaces between the door jam and the door and which dries to a crushable powder by the conclusion of the oven cycle. This new approach to the problem of sealing coke oven doors thus meets the sealing requirements of the Environmental Protection Agency while eliminating the problem of removing the coke oven doors. Further, the caulking composition is sufficiently stretchable to accommodate differential expansion of the door and door jam and warping of the metal parts. Finally, the composition may be easily applied by hand or by power caulking guns. Thus, instead of attempting to find a caulking composition which sets into a permanent seal as suggested by the prior art, the caulking composition of the present invention provides the necessary seal only for the time required by the coke oven cycle, at which time the caulking composition has dried to a crushable powder which is easily removed. Further, the composition is self-adhesive, permitting recaulking at any time during the coking cycle.

The high temperature caulking composition of the present invention is thus suitable for sealing coke oven doors and may be utilized in similar applications requiring sealing of an oven closure or the like. The caulking composition is a semi-fluid putty-like compound which may be applied by a conventional caulking gun. The composition is sticky to be adhesive to metal surfaces at elevated oven temperatures, permitting direct application to coke oven doors and door jams. The composition has sufficient bulk to meet the strict Environmental Protection Agency sealing requirements and finally the caulking composition dries to a crushable powder at the conclusion of the coking cycle, permitting opening or removal of the coke oven doors.

DESCRIPTION OF THE PREFERRED CAULKING COMPOSITIONS AND METHOD

The caulking composition of the present invention includes, by weight, 19 to 23% of a high temperature application silicone oil, preferably dimethyl polysiloxane, 20 to 34% of a thermally conductive white metal oxide, 20 to 34% of an inert particulate filler material and 22 to 35% of a hydrated alkaline metal hydroxide. As set forth above, the composition must stick to metal surfaces at elevated temperatures up to about 1200° F, stay pliable during the coking cycles and dry to a crushable powder by the conclusion of the oven cycle. As described below, drying of the caulking compound is a function of time and temperature, but the compound will maintain sealing after drying and new calking may be applied directly over the old.

The preferred silicone oil, dimethyl polysiloxane, is a high temperature application fluid which has excellent thermal stability and a low viscosity-temperature coefficient. Dimethyl polysiloxane is not reactive, even at elevated temperatures, is resistant to oxidation and highly water repellent. Silicone oils are used as lubricants for rubber, plastics and the like, as damping fluids, liquid dielectrics and other applications. Dimethyl polysiloxane has also been utilized in electronic heat-sink compositions because of its ability to suspend filler materials as disclosed in U.S. Pat. No. 3,885,984. As set forth above, the preferred range of dimethyl polysiloxane in the caulking composition of this invention is 19 to 22% by weight, with an optimum concentration of about 20%. The silicone oil serves as the carrier or binder in the caulking composition of this invention.

The preferred white metal oxide is zinc oxide, although titanium dioxide, magnesium oxide and similar white metal oxides are acceptable. The color and particle size of commercially available zinc oxide aids the caulking composition in adhering to metal surfaces, particularly at elevated temperatures, helps retard the flammability of the silicone oil and zinc oxide is not reactive in the mixture. Further, zinc oxide serves as a temperature elevator and provides good thermal conductance. The preferred caulking composition includes 23 to 29% of a particulate white metal oxide with an optimum of about 26% by weight zinc oxide.

The preferred filler material is an inert particulate material, such as silica flour or most preferably whiting. Whiting is a white chalk or calcium carbonate utilized primarily as a pigment having the following approximate composition, by weight: calcium carbonate 95.6%, magnesium carbonate 3.5%, aluminum oxide 0.25%, iron oxide 0.15% and silicon oxide 0.2%. Silica flour is a white commercially available powder. The filler material must be non-reactive, not subject to shrinking or cracking, particularly at elevated temperatures and is preferably added to the composition as a very fine powder referred to as "commercially fine". The fine particle size assures that the filler material is miscible and provides a good inexpensive filler. In the preferred composition, 23 to 29% by weight of inert particulate filler is utilized, with an optimum of about 26% by weight whiting.

The hydrated alkaline metal hydroxide is preferably hydrated lime which has the preferred white color and is principally responsive for the good adhesion of the caulking composition at elevated temperatures up to about 1200° F. Hydrated lime is also not reactive when mixed with the other constituents of the caulking composition. The preferred composition includes 26 to 32% by weight of a hydrated alkaline metal hydroxide with an optimum of about 28% by weight of commercially fine hydrated lime.

The caulking composition may be formed by first mixing the commercially fine powder constituents, including the white metal oxide, the filler material and the hydrated alkaline metal hydroxide. The silicone oil is then added and the composition is mixed until the consistancy is semi-fluid and putty-like. The mixing may be done by hand although a slow to medium speed, high torque, low shear mixer is preferred.

The constituents of the preferred caulking composition of this invention are commercially available from various sources. For example, the preferred silicone oil dimethyl polysiloxane is available from Dow Corning Co. under the trade name or designation "Dow Corning 200 Fluid". The most preferred dimethyl polysiloxane has a viscosity of 200 or 350 centistrokes. Silicone is a group name for semi-inorganic polymers made up of a skeleton structure of alternate silicon and oxygen atoms which are grouped as oils (fluids), resins, and rubbers.

The caulking composition of the present invention utilizes a silicone oil, preferably dimethyl polysiloxane, having the elevated temperature requirements described above. Zinc oxide is available as a very pure, french process powder from Matteson-Ridolfi, Inc., Detroit, Mich. The hydrated lime and whiting are available in commercially fine powders from numerous sources.

The following example sets forth the optimum or most preferred composition, however it will be understood that the concentration of each constituent may be varied within the stated ranges and alternative constituents should be substituted in molecular proportions. A mixture of equal parts by weight dry commercially fine zinc oxide, whiting and hydrated lime was mixed in a low speed, low shear commercial mixer. Liquid dimethyl siloxane was then slowly added, while continuing mixing, until an amount equal to three quarters of one part by weight was added. The proportions by weight were therefore one part each zinc oxide, whiting and lime and three quarters of one part dimethyl polysiloxane. Mixing was continued until the composition had a putty-like semi-fluid consistency.

The caulking composition thus formed was a soft pliable material. The caulking composition was then loaded into a commercial divorced-pump pneumatic power caulking gun and applied directly to the door jam of a by-product coke oven. The metal surfaces had temperatures ranging up to 1100° F. A bead of about ¾ inch wide, by ½ inch deep by 14 feet in length was caulked in about 30 seconds. The composition may also be applied by squirting or expelling same from a gun. The caulking material adhered very well to the hot metal surfaces and sealed the space between the door and the door jam. No evidence of smoke or toxic gases was seen. The material stayed pliable for 10 to 20 hours, depending upon the temperature. The material will stay pliable for several thousand hours at temperatures of less than 300°. After a 16 to 30 hour period, which is the cycle time of a coke oven, the caulking composition began to loose its adhesion and fall from the surfaces of the coke oven. The composition never became hard or brittle. When the composition dried out, it became crushable by hand. New applications of the caulking composition were then applied directly over the surfaces and good adhesion was found.

In other trials, the concentration of the silicone oil binder was increased to about ⅞ of one part, or about 23% by weight, with satisfactory results. At greater concentrations of the binder, excess smoking was found and the caulking was too moist. At concentrations of the binder below about 19% by weight, the composition does not form a flowable putty. Similarly, it was found that the concentration of zinc oxide and whiting could be varied about 25%, provided the total concentration of solids did not exceed about 80%. It was also found that the concentration of hydrated lime could be increased about 30%, but the caulking material did not have good adhesion when the concentration of the hydrated lime was decreased below about 22%.

As described above, the "drying time" of the caulking compound is dependant upon the temperature and weight percent of carrier. The caulking composition will however continue to seal after the compound has dried to a crushable powder. For example, in one test a composition having about 20 percent by weight dimethyl polysiloxane was applied to oven door surfaces having a temperature of about 1800° F. The caulking dried in less than an hour, but continued to seal. The caulking however lost its elasticity and therefore was unable to accomodate expansion or warping of the door. Where leakage did occur, new caulking was applied directly over the old with excellant results. Further, where new caulking is applied during the oven cycle, or the temperature of the surfaces are relatively low, the caulking may not have dried at the end of the cycle. This does not create a problem because the caulking may be easily removed, where necessary, or the caulking may be left for the next cycle.

The caulking compositions defined above had good adhesion to oven surfaces at elevated temperatures up to about 1200° F. The caulking sealed the doors, retaining about 95% of the escaping gases. The caulking composition also reduced door and frame repair requirements. In each case, the doors were easily removed following the coking cycle, which is a very important advantage over the prior art. Further, the caulking compositions were found to be self-adhering, permitting repair of the caulking by simply applying new caulking over the old where leaks occurred.

It will be understood that various modifications may be made to the caulking composition and method of this invention without departing from the purview of the appended claims. For example, the caulking composition may be applied by any suitable means, including hand trowelling. Further, the composition may be varied within the stated ranges, particularly where the composition is utilized to seal other oven enclosures.

I claim:

1. A high temperature caulking composition for sealing oven closures and the like, particularly coke ovens, comprising:
    a semi-fluid putty-like compound which is adhesive to metal surfaces at elevated oven temperatures and dryable to a crushable powder, having by weight 19 to 23% of a high temperature silicone oil, 20 to 34% of a thermally conductive white metal oxide, 20 to 34% of inert particulate filler material and 22 to 35% of a hydrated alkaline metal hydroxide.

2. The oven caulking composition defined in claim 1, characterized in that said silicone oil is dimethyl polysiloxane.

3. The oven caulking composition defined in claim 2, characterized in that the concentration of dimethyl polysiloxane is 19 to 22% by weight.

4. The oven caulking composition defined in claim 1, characterized in that said conductive white metal oxide is zinc oxide.

5. The oven caulking composition defined in claim 1, characterized in that said hydrated alkaline metal hydroxide is hydrated lime.

6. A high temperature caulking composition particularly for coke ovens, comprising:
    a flowable putty-like compound which is adhesive to hot metal surfaces up to about 1200° F and dryable to a crushable powder, having by weight 19 to 23% fluid dimethyl polysiloxane, 20 to 34% zinc oxide, 20 to 34% whiting and 22 to 35% hydrated lime.

7. The oven caulking composition defined in claim 6, characterized in that the concentration of dimethyl polysiloxane is about 20% by weight.

8. The caulking composition defined in claim 6, wherein the concentration of zinc oxide, whiting and hydrated lime are each about 27% by weight.

9. A high temperature caulking composition for sealing coke ovens comprising:
    a semi-fluid putty-like composition which is adhesive to metal surfaces at elevated oven temperatures and dryable to a crushable powder, comprising by weight 19 to 22% of a high temperature silicone oil having a viscosity of about 350 centistoke, 23 to 29% of a thermally conductive white metal oxide powder, 23 to 29% of an inert white particulate filler material and 26 to 32% of a hydrated alkaline metal hydroxide.

10. The caulking composition defined in claim 9, characterized in that said silicone oil is dimethyl polysiloxane.

11. A method of sealing high temperature metal oven closures, particularly coke oven doors, lids and caps and the like, comprising the steps of:
    forming a semi-fluid putty-like composition which is adhesive to hot metal surfaces up to about 1200° F, having by weight 19 to 23% of a high temperature fluid silicone oil, 20 to 34% of a thermally conductive white metal oxide, 20 to 34% of an inert particulate filler material and 22 to 35% of a hydrated alkaline metal hydroxide,
    sealing the metal oven closures by applying said putty-like composition to the hot metal surfaces surrounding said closures following charging of the oven, and
    resealing the oven closures following recharging the oven directly over the same metal surfaces without cleaning.

12. The method of sealing high temperature metal oven closures defined in claim 11, characterized in that said fluid silicone oil is 19 to 22% dimethyl siloxane.

13. A method of sealing coke oven door and the like, comprise the steps of:
    forming a flowable putty-like composition which is adhesive to hot metal surfaces and dryable to crushable powder, having by weight 19 to 22% dimethyl polysiloxane, 20 to 34% of a white metal oxide, 20 to 34% of an inert particulate filler material and 22 to 35% of a hydrated alkaline metal oxide,
    sealing the coke oven door by applying said putty-like composition to the hot metal surfaces surrounding said doors following charging of the coke oven with coal, and
    resealing the doors following recharging of said coke oven directly over the dry sealing composition.

* * * * *